United States Patent [19]

Johannes et al.

[11] Patent Number: 4,914,655

[45] Date of Patent: Apr. 3, 1990

[54] MULTIPLEXING ARRANGEMENT FOR A DIGITAL TRANSMISSION SYSTEM

[75] Inventors: Virgil I. Johannes; Frank J. Peragine; Lowell D. White, all of Holmdel, N.J.

[73] Assignees: American Telephone and Telegraph Company, New York, N.Y.; AT&T Bell Laboratories, Murray Hill, N.J.

[21] Appl. No.: 876,720

[22] Filed: Jun. 20, 1986

[51] Int. Cl.$^4$ .............................................. H04J 3/06
[52] U.S. Cl. .................................... 370/112; 371/37.1; 371/48.1; 371/49.1
[58] Field of Search ....................... 375/25; 370/12, 77, 370/82, 112; 371/48, 49, 50, 37

[56] References Cited

U.S. PATENT DOCUMENTS

| | | | |
|---|---|---|---|
| 3,995,119 | 11/1976 | Pachynski, Jr. | 370/112 |
| 4,160,877 | 7/1979 | Vander May | 370/112 |
| 4,271,508 | 6/1981 | Schenk | 370/112 |
| 4,285,062 | 8/1981 | Yoshida et al. | 370/12 |
| 4,398,292 | 8/1983 | Doi et al. | 371/39 |
| 4,433,415 | 2/1984 | Kojima | 371/37 |
| 4,453,250 | 6/1984 | Hoshimi et al. | 371/40 |
| 4,545,052 | 10/1985 | Steierman | 370/99 |
| 4,562,578 | 12/1985 | Odaka et al. | 371/39 |
| 4,586,186 | 4/1986 | Anderson | 375/3 |
| 4,633,464 | 12/1986 | Anderson | 370/111 |
| 4,730,302 | 3/1988 | Fuerlinger et al. | 370/13 |
| 4,731,783 | 3/1988 | Fontanes | 370/84 |
| 4,737,949 | 4/1988 | Yamamoto | 370/13.1 |

OTHER PUBLICATIONS

Transmission Systems for Communications, 5th Ed., 1982, by Bell Telephone Laboratories, Inc., pp. 109-119, 592-606, 818-820.

The Bell System Technical Journal, vol. 56, No. 7, Nov. 1977, pp. 1297 and 1314-1315 (See Exp. pp. 1314-1315), The Switched Digital Network Plan; J. E. Abate, L. H. Brandenburg, J. C. Lawson and W. L. Ross.

Second International Conference on Telecommunication Transmission, Mar. 1981; Organized by Electronics Division of Institution of Electrical Engineers, I.E.E., pp. 49-52.

Transmission Systems for Communications, 5th Edition, by Members of the Technical Staff Bell Telephone Laboratories, 1982, pp. 686-688.

Primary Examiner—Douglas W. Olms
Assistant Examiner—Stephen Chin
Attorney, Agent, or Firm—Richard B. Havill

[57] ABSTRACT

A multiplexer is arranged for interleaving blocks of bits from tributary lines. Sequences of blocks of digital bit streams are received in frames from each tributary line. Each frame includes tributary line identification information and plural blocks of bits. Each block of digital bits includes plural data bits and a parity bit. The sequence of blocks from one tributary line also includes in a periodic one of the parity bit positions, a bit containing control information. The blocks of digital bit streams are multiplexed into a single multiplexed bit stream.

32 Claims, 7 Drawing Sheets

FIG. 3 TABLE A

| FRAME | BLOCK | \multicolumn{24}{c|}{BIT POSITIONS} | PARITY |

FIG. 5
TABLE B

| TRIBUTARY | A | B | C | D | A | B | C | D | ... | C | D | A | B | C | D | A | B |
|---|---|---|---|---|---|---|---|---|---|---|---|---|---|---|---|---|---|
| FRAME | 1 | 3 | 2 | 4 | 2 | 3 | 2 | 4 | | 3 | 1 | 2 | 4 | 3 | 1 | 3 | 4 |
| BLOCK | 56 | 30 | 16 | 42 | 1 | 31 | 17 | 43 | | 15 | 41 | 56 | 30 | 16 | 42 | 1 | 31 |

← 224 PARITY BLOCKS →

TIME →

MULTIPLEXING ARRANGEMENT FOR A DIGITAL TRANSMISSION SYSTEM

This invention relates to a parity block multiplexing arrangement that is described more particularly as an arrangement which multiplexes digital signals from plural tributary lines into a single repeatered line while simultaneously transmitting through the multiplexing arrangement supervisory signaling for controlling both the tributary lines and the single repeatered line.

BACKGROUND OF THE INVENTION

Submerged repeater supervision is the basic reason for special terminals in submarine lightguide transmission systems. However, repeater supervision is also the major hurdle in creating a submerged multiplex for such systems.

Currently line monitoring and fault locating functions are used fro maintaining digital transmission systems. One method used for line monitoring is the determining of a bit error rate by inserting at the transmitting terminal a block parity bit in a predetermined position in the data stream after each block of data. Each block of data and its block parity bit are analyzed for block parity violations at the receiving terminal or at an intermediate point along the line. Any block parity violations are counted over a period of time and are computed into a bit error rate.

Fault locating is a procedure used for determining which repeater section of the line is the source of a trouble condition when the line monitoring arrangement indicates there is an inordinately high bit error rate.

One useful control signalling arrangement for a pulse transmission system, as described in U.S. Pat. No. 4,633,464, uses a main data stream including a block parity channel. Control signals are transmitted from an end terminal to repeaters by inserting the control signals, as inverted, or complemented, parity bits, in periodically spaced bit positions of the block parity channel. At the repeaters, the control signals are separated from the block parity signals and are decoded for controlling selectively circuits or devices for maintenance operations. For that pulse transmission system, a maintenance response signalling arrangement, as described in U.S. Pat. No. 4,586,186, uses the main data stream for transmission of maintenance response signals between the repeaters and the end terminal. From any repeater, response information is modulated onto a subcarrier which is superimposed as a jitter signal onto the main data stream. At the end terminal, the response information is recovered from the jitter signal on the main data stream.

The supervision of undersea repeaters is based on a customized signal format provided by one of the terminals. This format includes a block parity bit for every block of twenty-four data bits. These block parity bits serve two functions. First of all, parity errors can be determined at the repeaters for monitoring the block error performance of the line. Secondly by intentionally inverting periodically one of the parity bits, the terminal sends command signals to the repeater and the repeater generates a subcarrier for sending responses back to the commanding terminal. Preserving these two functions presents major difficulties in using previously existing digital multiplex achitectures in undersea systems.

Typical digital multiplex architectures either interleave plural bit streams by bit interleaving or by time division multiple access. Any multiplex which performs bit interleaving destroys any block parity function of the tributaries because the bit count of the main data stream is the total of the bit counts of the plural tributary bit streams. The block parity bits of the tributary lines become meaningless in the multiplexed data stream. Alternatively, a time division multiple access arrangement, receives signals from plural tributaries operating at the same data rate as the multiplexed line. The signals on the tributaries are bursty in the sense that there are gaps between blocks transmitted on each tributary line. The gaps on one tributary line concur with the blocks of data transmitted on other tributaries. The blocks are interleaved in the multiplexed data stream, however, guard intervals are included between the blocks of data on both the tributary lines and on the multiplexed data stream. Although these guard intervals assure that the data from one tributary line do not interfere with the data from another tributary line, the guard intervals reduce the efficiency of the line. That is the guard intervals are unused transmission capacity.

Order wire operation from a station at one terminal to a station at another terminal also is based on the customized signal format provided by the terminal. This format periodically provides bits specifically designated for communications originating in a station located at one terminal and terminating in a station locted at a second terminal. Transmitting these order wire signals also presents a problem for previously existing multiplex architectures.

SUMMARY OF THE INVENTION

These and other problems are solved by a multiplexing arrangement for interleaving continuous blocks of bits from tributary lines. Sequences of blocks of digital bit streams are received in frames from each tributary line. Each frame includes tributary line identification information and plural blocks of bits. Each block of digital bits includes plural data bits and a block parity bit. The sequence of blocks from one tributary line also includes periodically, in one of the block parity bit positions, an inverted parity bit containing control information. The blocks of digital bit streams are multiplexed into a single block multiplexed bit stream without guard intervals.

The same arrangement can be used in terminal transmission equipment for such systems.

BRIEF DESCRIPTION OF THE DRAWINGS

The invention may be more fully understood by reading the subsequent detailed description with reference to the appended drawings wherein.

DETAILED DESCRIPTION
SIGNALING AND ERROR MONITORING IN A REPEATERED LINE

Figure 2:
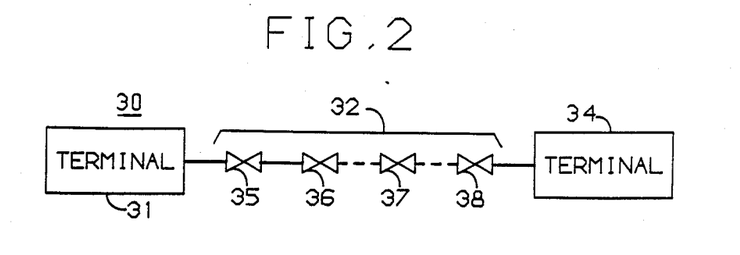
FIG. 2 is a block diagram of a digital transmission system without multiplexing.

With reference to FIG. 2, there is shown an optical fiber transmission system 30 without any muyltiplexing arranged for deployment under an ocean. The system is designed to transmit pulse code modulation signals from a west end terminal 31 through a repeatered line 32, which may be as long as several thousand kilometers, to an east end terminal 34. Simultaneously, another pulse stream is transmitted from the east end terminal 34 to the west end terminal 31. The optical pulse streams are attenuated in fibers along the line. At repeaters 35, 36, 37, and 38, located regularly along the line, the pulse streams are regenerated to insure good quality transmission. Although only four repeaters are shown in FIG. 2, as many as a hundred or more repeaters may be used in the line. Thus the line is shown broken between repeaters 36, 37 and 38 to indicate that additional repeater sections may be inserted.

A block parity error detecting scheme is used in the system for monitoring continuously the quality of signal transmission in both directions along the line.

Figure 3:
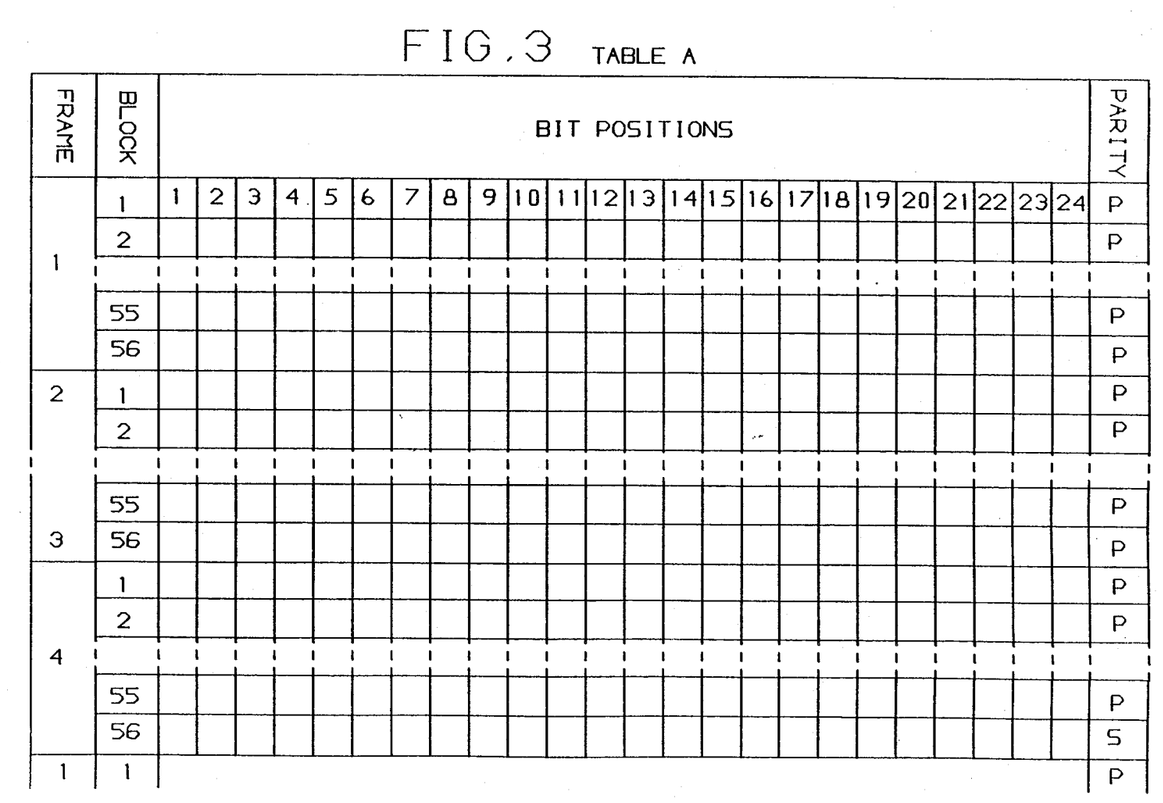
FIG. 3 is a table showing the fromat of frames of bits used in the system of FIG. 2.

As shown in Table A in FIG. 3, the pulse code modulation line signals are formatted in repetitive groups of four frames, each frame including fifty-six blocks of encoded data. Each block includes twenty-five bits. There are twenty-four data bits plus an even block parity bit P in each block except the last block 56 of frame 4. The block parity bits are located in the last bit position of the blocks. The blocks of data are transmitted from terminal to terminal in both directions simultaneously. Thus the block parity bits in a frame provide a block parity channel in both directions of transmission from terminal to terminal through the entire length of the system.

In addition to measuring the end-to-end bit error rate, a maintenance signaling system is superimposed on this block parity channel for controlling the monitoring of in-service performance of the repeater sections, for controlling the substitution of spare devices or equipments in repeaters located on the ocean floor, and for controlling other functions such as substituting one fiber for another fiber.

In the block parity channel, one parity bit position of every fourth frame is assigned to maintenance signaling. This repetitive, or periodic bit position S, located in the last bit position of block 56 in frame 4 in FIG. 3, is used for transmitting commands from either one of the terminals out along the repeatered line toward the other end terminal. Command signals are generated by inverting the designated periodic parity bits, as described in U.S. Pat. No. 4,633,464. The resulting bit stream of one-out-of-224 bits in the block parity bit channel is ignored at the far end for determining the bit error rate of the system. Hereinafter this stream of signaling bits is referred to as a command channel for maintenance signaling. Such command channel is available in both directions in the system so that maintenance signaling can be initiated from either end terminal. In later examples described herein, the periodic parity bit position is repeated every frame or every second frame.

The maintenance signaling is used in the transmission system for performing a variety of functions. A bit error rate can be determined selectively at every line section in the system on an in-service basis. The automatic gain control voltage and the laser bias current of every regenerator can be monitored selectively. By remote control, spare equipment, such as laser transmitters, regenerators and fibers, can be switched to replace other similar failing or failed equipment in the system.

Such maintenance signaling is accomplished by encoded commands sent out along the repeatered line in either command channel as described in a U.S. Pat. No. 4,633,464, issued in the name of C. D. Anderson. As described by Anderson, an inverted, or complemented, block parity bit, or signaling bit S, is inserted into the block parity channel in the last block of every fourth frame. Because the signaling bits S are positioned cyclically, a command signaling channel is superimposed on the block parity channel. From this command channel, the signaling bits S can be recovered readily along the repeatered line or at the far terminal. The recovered complemented block parity bits, or signaling bits S, are detected and decoded into signals for controlling equipment or circuits, in accordance with command code words.

A response channel as described in U.S. Pat. No. 4,586,186, also issued in the name of C. D. Anderson, is used for communicating information from a repeater back to the terminal that initiated the command for the information. This response channel is accomplished by phase modulating the line signal leaving the repeater in the direction toward the commanding terminal. The subcarrier frequency of this phase modulation is determined by the period and thus the frequency of the S bits. The frequency of the S bits is the same for both the command channel and the response channel.

PARITY BLOCK MULTIPLEXING

Figure 1:
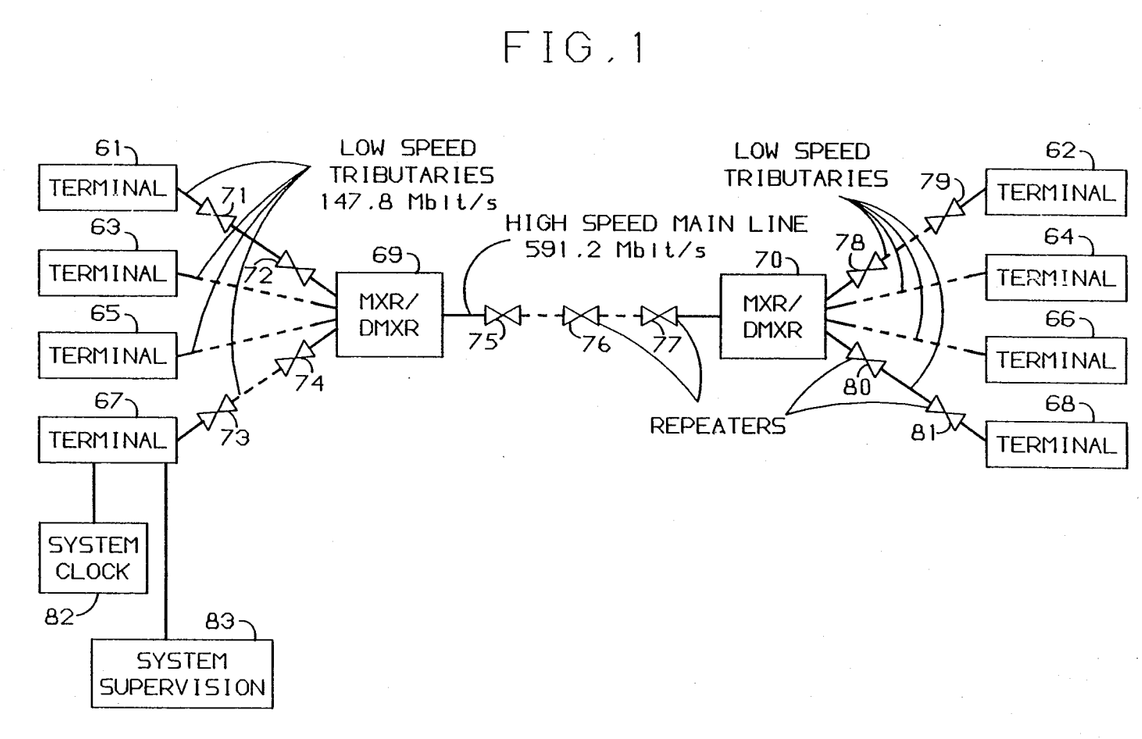
FIG. 1 is a block diagram of a digital transmission system arranged for block multiplexing in accordance with the invention.

Referring now to FIG. 1, it shows an optical fiber transmission system, with two submerged multiplexes 69 and 70, arranged for deployment under an ocean. Terminals 61, 63, 65 and 67 and submerged multiplex 69 are at the west shore of the ocean. Termianls 62, 64, 66 and 68 and submerged multiplex 70 are on the east shore. The system is designed to transmit pulse code modulation signals from the west shore terminal 61 to the east shore terminal 62 via the two submerged multiplexes 69 and 70 and the three repeatered lines containing repeaters 71, 72, 75, 76, 77, 78 and 79. Simultaneously, another pulse stream is transmitted from the east shore terminal 62 to the west shore terminal via the two submerged multiplexes 70 and 69 and the three repeatered lines containing repeaters 79, 78, 77, 76, 75, 72 and 71. Similarly, pulse code modulation signals are transmitted between pairs of terminals 63 and 64, 65 and 66, and 67 and 68.

The repeaters in the high-speed main line, including the repeaters 75, 76, and 77, and in each of the eight low-speed tributaries respond to supervisory commands in the same manner, as was described above for the arrangement of FIG. 2. As in that arrangement, each terminal in FIG. 1 formats the outgoing tributary stream into 25-bit parity blocks. Each terminal monitors the parity errors on the incoming stream. Each repeater can receive and respond to supervisory commands.

Each parity block multiplex 69 and 70 contains a parity block multiplexer and a parity block demultiplexer. The parity block multiplexer combines the four synchronous incoming low-speed tributary signals into one outgoing high-speed main line signal. The parity block demultiplexer separates one incoming high-speed main line signal into four outgoing low-speed tributary signals. The combining of tributary streams into a main line stream and the separating of the main line stream into four tributary streams are done so as to transmit the parity channel, the command channel and the response channel. In the multiplexes 69 and 70, the 25-bit parity blocks from the four tributaries are sequentially placed block-by-block on the high-speed main line. Each parity block consits of twenty-four data bits plus one parity bit. No service bits of any sort are added by the multiplexer to produce the multiplexed main line stream. At the receive end of the high-speed main line, a block-by-block separation is performed, and identification of the tributary streams for routing purposes is done via unique 12-bit frame alignment words within each tributary stream.

Note the following properties of the multiplexed main line stream. Each parity error in an incoming tributary signal to the parity block multiplexer continues as a parity error in the outgoing multiplexed main line stream. Each parity error being transmitted along the multiplexed main line stream is demultiplexed as a parity error in one of the outgoing low-speed tributary signals. Thus, the parity errors in the entire system can be continuously monitored. Intentional parity violations, inserted on a low-speed tributary signal at a rate of P per second, cause parity violations at a rate of P per second on the multiplexed stream. By choosing suitable values for P, command and response channels for the repeaters of the multiplexed signal are established throughout the system.

Transmission of a response channel through a submerged multiplex from a tributary line to the main line or from the main line to the tributary lines is accomplished by putting a phase modulation on the outgoing signal(s) based on the phase modulation of an incoming signal. In the parity block multiplexer, the phase modulation is put on the outgoing main line stream with a clock obtained by multiplying the clock rate of the incoming tributary having the response signal. Selection of the tributary clock is done via a command to the parity block multiplexer from the terminal. In the parity block demultiplexer the phase modulation on the incoming main line stream is put on all outgoing tributary signals with clocks obtained by dividing the main line stream clock rate.

Note that in a submerged multiplex, parity blocks are interleaved and separated without adding or deleting any bits. This is accomplished by using a single clock, 82 in FIG. 1, for providing the signal frequencies for the four tributaries that are to be interleaved into a multiplexed signal. The signal frequency of this multiplexed signal is in turn derived from the frequency of one of the tributaries. In short, the system uses loop timing.

PARITY BLOCK MULTIPLEXER - OVERVIEW

Figure 4:
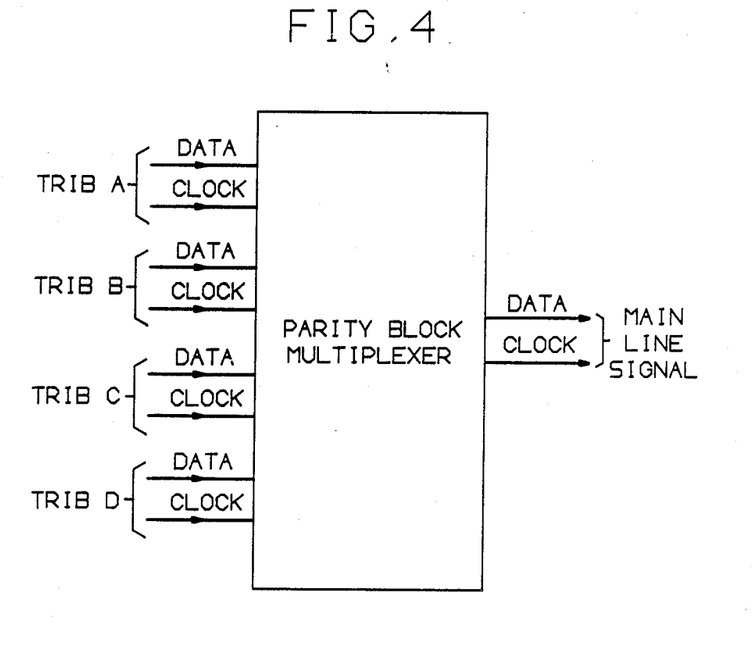
FIG. 4 is a block diagram of a parity block multiplexer.

The inputs and outputs of a parity block multiplexer 84 are shown in FIG. 4. The multiplexed main line bit stream operates at a bit rate of nx equals 591.2Mbits per second, and the low-speed tributaries bit rate is x equals 147.8Mbits per second, where X is the tributary bit rate and n is the number of tributaries. The letter n equals 4 in the illsutrative example. Reliability, adequate for undersea use, is attained via sparing and protection switching under supervisory control. If one of the tributaries should fail, the undersea multiplexer will insert dummuy parity blocks in the failed tributary's place on the main line.

Figure 5:
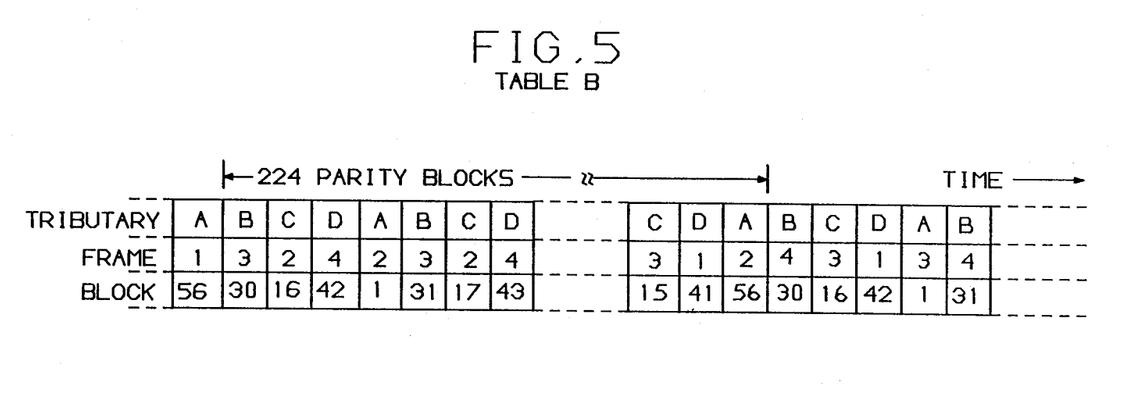
FIG. 5 is a table showing an example of the format for multiplexing parity blocks from four tributary lines.

The format of the multiplexed stream is shown in the Table B of FIG. 5. The horizontal axis is time. As shown in the top and bottom rows, a whole parity block from each tributary, is multiplexed sequentially onto the main line. For example, the left hand column represents frame 1, block 56 from tributary A. The next block multiplexed into the main line is frame 3, block 30 from tributary B. These are followed by blocks from tributaries C and D. Then the next subsequent block from tributary A is inserted. This block is block 1 of frame 2 from tributary A. Between two sequential 25-bit parity blocks from tributary A are a 25-bit parity block from tributary B, a 25-bit parity block from tributary C, and a 25-bit parity block from tributary D. Similar relationships hold for sequential 25-bit parity blocks from the tributaries B, C and D.

The signaling channel on the main line is activated by putting a signaling bit S in block 56 of periodic frames of any one selected tributary. The frequency of the S bits depends upon the system. For this example, with four tributaries, of the signal to repeaters in the main line, the S bit is inserted in every frame of the selected tributary rather than every fourth frame as shown in FIG. 3. As shown in FIG. 5, this results in a signaling bit every 224 parity blocks, as is the case in FIG. 3. However, in the present example, to signal to repeaters in a tributary line, the signaling channel on the tributary is activated by putting a signal bit S in block 56 of every second frame, which is half the frequency of that for the main line signaling channel.

The clock for the multiplexed main line stream is derived from the incoming clock of one of the tributaries. If this tributary is carrying a supervisory response in its response channel, a corresponding response will be put on the response channel of the multiplexed main line stream.

Supervisory signaling to the parity block multiplexer is used to select which tributary clock is used to generate the clock for the multiplexed main line stream. By selecting the appropriate tributary clock at desired times, supervisory responses are transmitted through the parity block multiplexer.

PARITY BLOCK DEMULTIPLEXER - OVERVIEW

Figure 6:
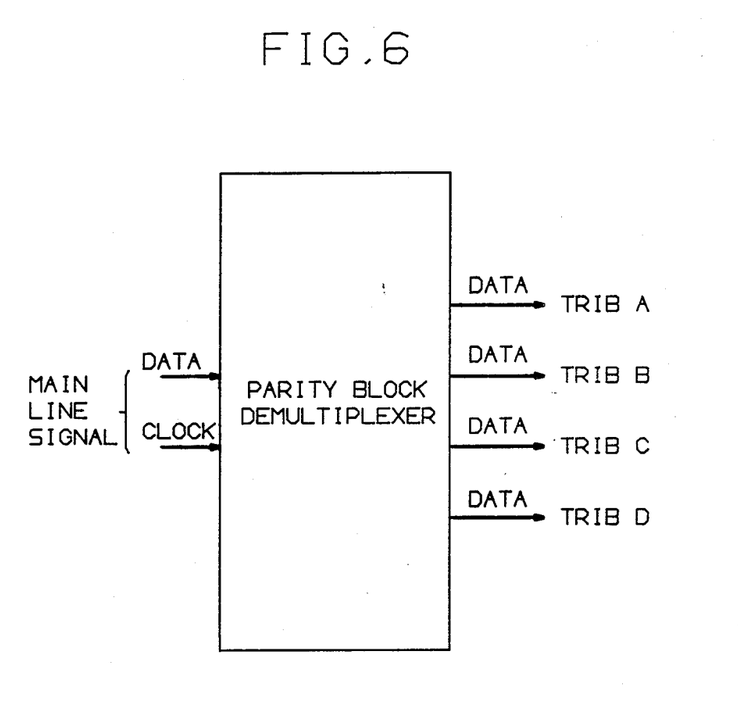
FIG. 6 is a block diagram of a parity block demultiplexer.

The inputs and outputs of a parity block demultiplexer 86 are shown in FIG. 6. The incoming main line signal, the multiplex format of which is shown in FIG. 5, is separated successively block-by-block into four outgoing tributary line signals, with all of the tributary A parity blocks in one tributary line signal, all of the tributary B parity blocks in a second tributary signal, all of the tributary C parity blocks in a third tributary line signal and all of the tributary D parity blocks in a fourth tributary line signal. All of the tributary clocks are derived from the clock in the multiplexed main line stream. If the response channel of the multiplexed stream is carrying a supervisor response, this response appears in the response channel of each tributary line.

The identities of the tributaries are determined by observing the 12-bit frame alignment words that occur once each frame. Each tributary has its own unique 12-bit frame alignment word.

SUPERVISION WITH SUBMERGED MULTIPLEXERS

With reference to FIG. 1, supervision of the high-speed main line, of the submerged multiplexes 69 and 70, and of the low-speed tributary lines connected to terminals 67 and 68 is done from terminal 67. Commands are sent to the high-speed repeaters 75, 76 and 77 by inserting a signaling bit S into every frame of the tributary line signal from terminal 67. The commands to the low-speed repeaters 73, 74, 80 and 81 are sent by inserting a signaling bit into every second frame of the signal from terminal 67. Supervision of the other six low-speed tributaries is done via appropriate supervisory commands from one of the terminals at the shore end of one of those tributaries.

Superivsory response to commands sent from terminal 67 to any one of the high-speed repeaters 75, 76 or 77 come back through the submerged multiplex 69 and the west shore tributary lines to all of the terminals 61, 63, 65 and 67. Similarly, a response to a command from the terminal 67 to either of the low-speed repeaters 80 or 81 comes back to all of the termials 61, 63, 65 and 67 via both multiplexes 70 and 69 and the west shore tributaries. A response to a command from the terminal 67 to either repeater 73 or 74 is transmitted back to terminal 67. Similarly, a response to a command to a repeater in any of the other low-speed tributary lines is transmitted back to the commanding terminal at the end of that same low-speed line.

The end-to-end error performance from terminal 67 to terminal 68 is monitored at terminal 68 by observing the parity errors in the parity channel. Similar statements apply to monitoring the errors in transmission between pairs of terminals 61 and 62, 63 and 64, and 65 and 66.

Errors generated in the high-speed line are monitored by observing the parity errors which are detected in the high-speed repeaters 75, 76 and 77.

Figure 7:
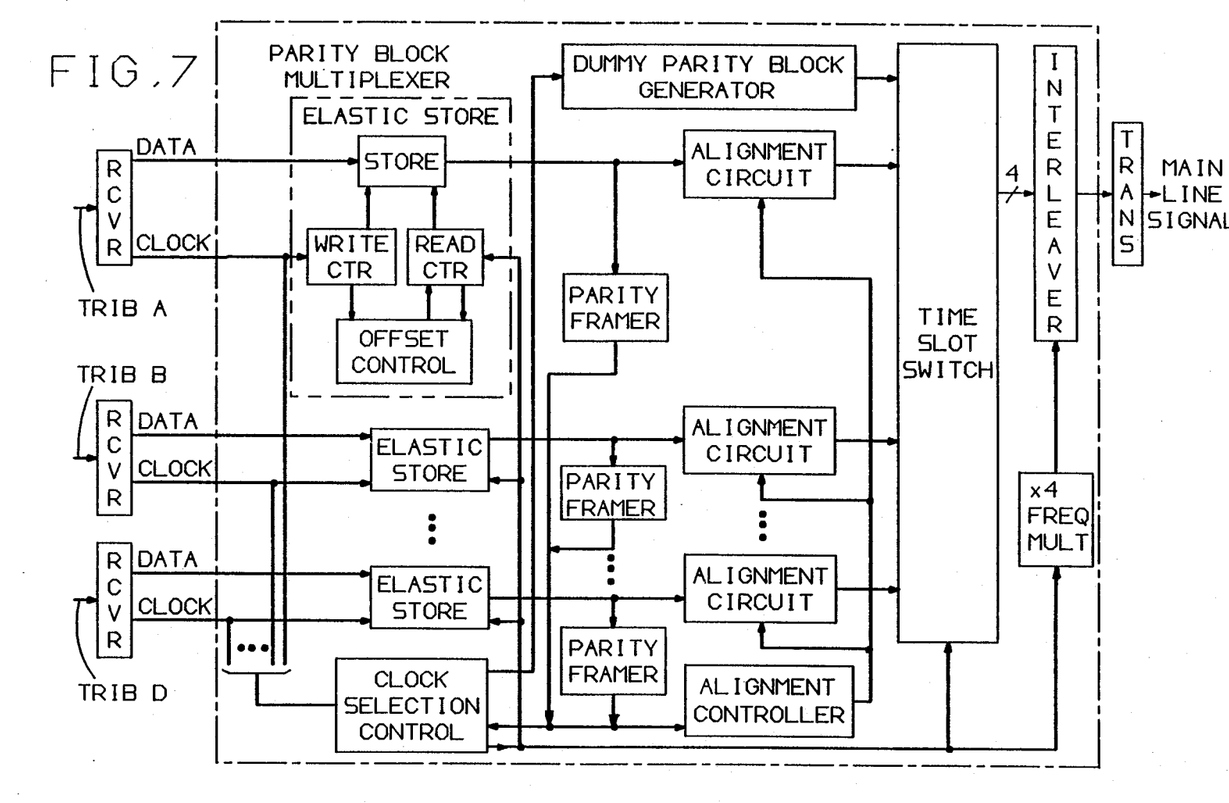
FIG. 7 is a detailed block diagram of a parity block multiplexer.

FIG. 7 is a block diagram of the parity block multiplexer circuit 84 of FIG. 4. Data and clock are recovered by receivers 87, 88, and 89 from signals received on each of the tributary designated TRIB A, TRIB B, TRIB D. A TRIB C is assumed but not shown in FIG. 7. One of the tributary clocks is chosen, via a clock selection control circuit 90 and applied supervisory signaling, to be the sourse of multiplexer timing. The selected tributary clock is distributed by way of a lead 91 to all of the signal processing circuits, such as elastic stores 95, 96, and 97 and time slot switch 99, and is multiplied by four in a frequency multiplier 100 to obtain the main line clock.

Each tributary is equipped with a parity framer circuit 101, 102, 103, and an alignment circuit 105, 106, 107. Those and a moltiplexer alignment controller circuit 108 line up the tributary parity blocks so that the parity time slot in each block from each tributary occurs at the same time at the input to the time slot switch 99. The time slot switch 99 changes the format of the tributary parity blocks so that an interleaver 110, operating on the four outputs of the time slot switch 99, produces interleaved parity blocks on the main line 115, at a bit rate that is four times the tributary bit rate.

The alignment circuit 105, 106, and 107, for each tributary line, makes up for varying physical and electrical lengths of the tributary lines. In order for the tributary streams to be aligned, the parity time slots must be located, and for this purpose a parity framer 101, 102, and 103 is used on each tributary. The parity framer is bridged onto the tributary data line 121, 122, and 123. Its function is to search for even parity blocks that are twenty-five time slots long. The parity framer 101, 102, and 103 then marks the position of the parity time slot with an output pulse on a control lead 125.

The elastic store 95, 96 and 97 of each tributary circuit arrangement is written by using the associated tributary clock, applied through a write counter circuit 116 to a store 117, and is read from the store 117 by using the particular tributary clock that the clock selection control circuit 90 has selected as the master. The selected clock is applied through a read counter circuit 118. An offset control circuit 130 in each elastic store, such as store 95, ensures that no data is lost in the read/write operations of the elastic store. At the outputs of all of the elastic stores, the tributary data from all of the tributaries is time slot coincident, since the selected clock on the lead 91 is used to real all the elastic stores. Once the parity framer 101, 102, and 103 on each tributary line 121, 122, and 123 is satisfied, the multiplexer alignment controller circuit 108 can compute the desired delay line setting for each tributary alignment circuit 105, 106, and 107 such that parity blocks coincide at the outputs of the alignment circuits 105, 106, and 107.

If the parity framer on a given tributary cannot frame, the clock selection control will designate that tributary as being bad and cause the output of the dummy parity block generator 140 to replace the data from the bad tributary as an input to the time slot switch 99. This will ensure that the multiplexer output on the main line 115 will contain enough transitions to allow timing to be extracted in the high speed repeaters 75, 76, and 77, shown in FIG. 1.

The multiplexer time slot switch 99 changes the format of the several received tributary line signals preparatory to interleaving them into the main line signal. The format of the main line signal is one of interleaved parity blocks from the several tributaries, as shown in FIG. 5. The time slot switch 99 is composed of some per tributary logic circuitry and some common logic circuitry in addition to a switching arrangement which allows the output of the dummy parity block generator to be substituted for any fo the tributary line signals in response to a signal from the clock selection control circuit 90.

The per tributary logic in the time slot switch 99 consists of two banks of shift register memory for each tributary input. Each bank of registers holds a twenty-five bit parity block. Data is written into the banks of registers on an alternating basis. When a given register bank is being written to, the other register bank is being read from.

Under control of the common logic in the time slot switch 99, the reading from the banks of registers is done sequentially. During each time slot four bits are read at a time. The time slot switch 99 output appears on a four rail parallel bus 132 which drives the interleaver 110.

The multiplexer alignment controller circuit 108 receives framing information from each tributary parity framer circuit 101, 102, and 103 and uses this framing information to compute the required delay settings for the associated alignment circuits 105, 106, and 107, which are programmable adjustable length shift register delay lines.

The adjustment of the variable delay line in the alignment circuit 105 for the tributary line TRIB A operates as follows. A twenty-five state counter in the alignment controller 108 is driven by the selected tributary rate clock and cycles continuously through all states. The parity framer circuit 101 identifies the location of the parity time slots in the bit stream of the tributary TRIB A. The multiplexer alignment controller 108 compares the location of these parity time slots to the state of the twenty-five state counter and determines the relative delay required to align the tributary. This required delay information is passed on to the tributary alignment circuit arrangement 105 to control the delay length of the alignment circuit.

The four rail parallel bus 132 output of the time slot switch 99 is converted to the line rate signal in the interleaver circuit 110. This interleaver circuit 110 simply sends the data from the four rail parallel bus to the transmitter to be put on the line in a sequential fashion. The interleaver circuit 110 is controlled by the line rate clock on a lead 133. This line rate clock is obtained from the selected tributary clock on the lead 91 in the times four frequency multiplier circuit 100.

The frequency multiplier 100, the only analog circuit in the multiplexer, is used to generate the line rate clock from the slected input tributary rate clock. This function is obtained through the use of a nonlinear device followed by a filter and a variable length delay line to ensure proper clocking margins in the interleaver circuit 110. If there are phase modulated supervisory responses on the tributary clock selected as the source for the line rate clock, those phase modulated supervisory responses are preserved in going through the times four multiplier circuit 100.

PARITY BLOCK DEMULTIPLEXER - BLOCK DIAGRAM

Figure 8:
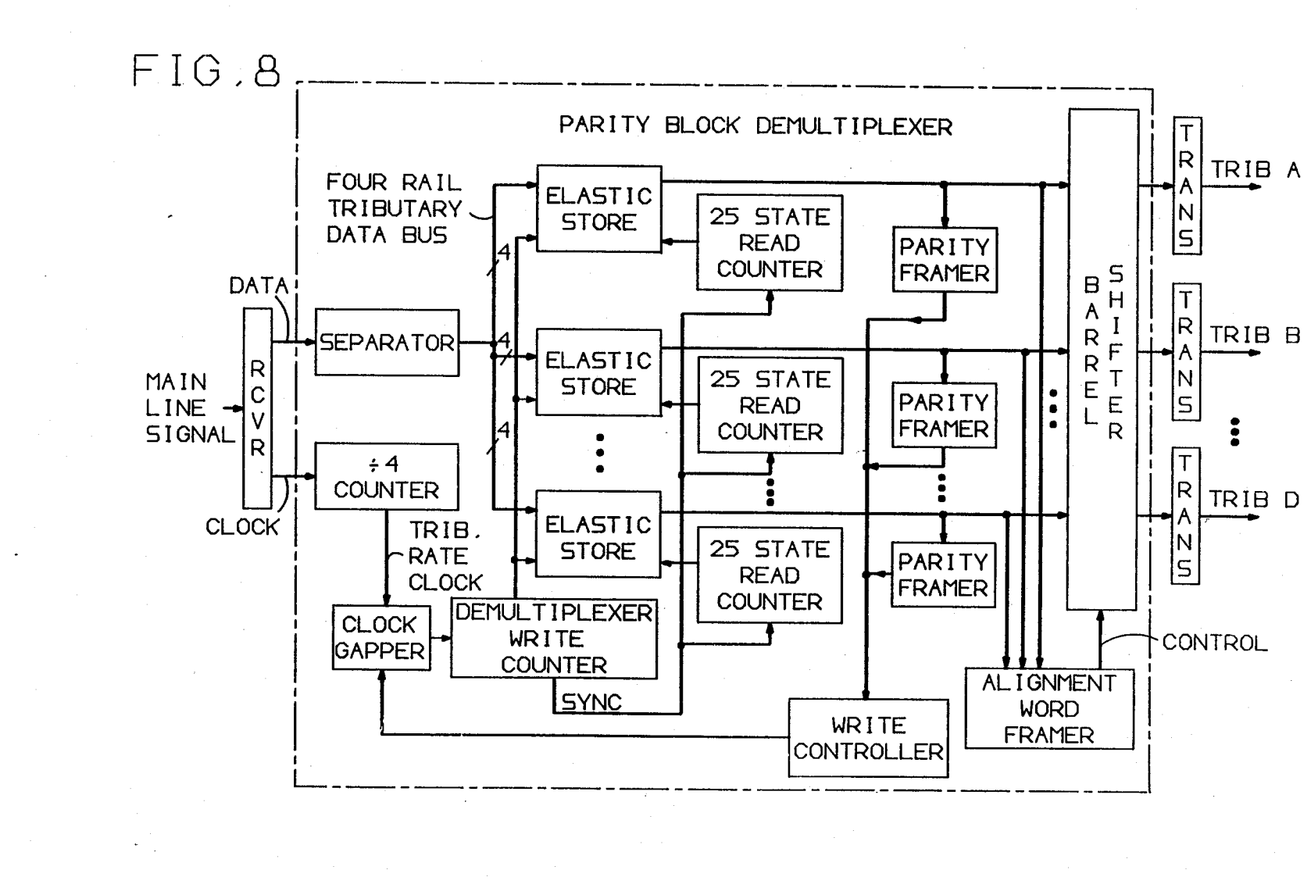
FIG. 8 is a detailed block diagram of a parity block demultiplexer.

FIG. 8 shows a block diagram of the parity block demultiplexer 86 of FIG. 6. The main line signal, composed of interleaved parity blocks from the several tributaries, is received on the main line lead 115. This main line signal is applied to a receiver 135 which reproduces the data stream on a lead 137 and recovers a clock signal on a lead 138. The main line signal is reduced to its four constituent tributary rate signals in the parity block demultiplexer 86. Inspection by the alignment word framer 180 of the unique identification word on each tributary block assures that output tributary data is directed to the proper receiving tributary line.

After separating the blocks in a separator circuit 110, the tributary data is written into per tributary 25-cell elastic stores 141, 142, and 143 and is read out on tributary leads 146, 147, and 148 in such a manner that continuous data is obtained. The read/write operation is performed in an adaptive manner such that it is ensured that complete parity blocks are obtained on each tributary lead 146, 147, and 148.

The separator circuit 140 receives line rate data. A tributary rate clock is obtained by dividing the main line clock rate by four in a counter circuit 178. The separator circuit 140 sequentially places the main line rate data onto a four bit wide output data bus 150 at the tributary rate.

The output of the separator circuit 140 can be viewed as being bursts of twenty-four data bits plus a parity bit for each tributary. These bursts are placed in sequence bit-by-bit across the four rail bus. It is the purpose of the following circuitry to change the format of this data into four separate continuous streams of tributary data on separate lines at the tributary rate. The four rail data is loaded four bits at a time sequentially into one elastic store 141 of the twenty-five cell elastic stores that reside on each tributary. When the store 141 is full, the next store 142 is then loaded, and so on. After the last store 143 is loaded, the first store 141 is loaded again. This process for all of the tributaries operates under the control of the common twenty-five state demultiplexer write counter 160. The elastic stores 141, 142, and 143 are read under the control of the read counters 161, 162, and 163 on each tributary. The "phase" of the write and read counters in maintained so that data will not be lost in the read/write process in the elastic stores. The data that is read from each elastic store, such as the store 141, is a continuous string at the tributary rate on the lead 146. A parity framer 166, 167, and 168, which is identical to the type used in the multiplexer, also resides on each tributary lead 146, 147, and 148 at the store outputs. The demultiplexer write controller 170 observes the output of the parity framers 166, 167 and 168 and uses this information from the parity framers to control the "phase" of the twenty-five state demultiplexer write counter 160 with respect to the phase of the incoming line rate data. The "phase" is varied by removing a cycle of the tributary rate clock input in the clock gapper circuit 175 before the tributary clock is applied to the demultiplexer write counter 160. When the demultiplexer write counter 160 is properly set, the twenty-five cell elastic store 141, 142, and 143 in each tributary line circuit will load only with data from that tributary line, and the parity framer 166, 167, and 168 on each tributary is satisfied when the stores are read. Note that the combination of the per tributary elastic store and the associated counters and controllers perform the inverse function of the time slot switch in the multiplexer of FIG. 7.

Since the reading of the elastic stores 141, 142 and 143 is done with a clock obtained by dividing the main line rate clock by four in a counter circuit 178 and since supervisory responses are carried by phase modulation of the line signals, supervisory responses on the incoming main line appear on all of the tributary leads 146, 147, and 148.

The final operation in the demultiplexer 86 is to ensure that the complete parity blocks being read from the elastic stores 141, 142, and 143 appear on the correct output lines 186, 187, and 188. For this operation, a shared alignment word framer 180 and barrel shifting circuit 182 are used. The alignment word framer 180 detects the unique identification word pattern on each tributary signal and provides commands to the barrel shifter to switch the tributary lead signals to the proper output line 186, 187, and 188 accordingly. The barrel shifter 182 is a simple switching array that can sequentially connect any of the tributary leads 146, 147, and 148 to any of the output lines 186, 187, and 188. It is necessary to ensure that only one tributary is correctly positioned. The barrel shifter circuit 182 is designed in such a way that when one tributary is correctly positioned, the others will be also.

The output lines 186, 187, and 188 from the barrel shifter circuit 182 are applied through separate transmitter circuits 191, 192, and 193 to the individual low-speed tributary lines TRIB A, TRIB B, and TRIB D.

The foregoing represents a description of an embodiment of the invention. That embodiment together with others made obvious in view thereof are considered to be within the scope of the appended claims.

What is claimed is:

1. A digital block multiplexer for interleaving blocks of bits from each of a plurality of input tributary lines, the multiplexer comprising
   means for receiving sequences of blocks of digital bit streams in frames, respectively from first and second tributary lines, each frame including tributary line identification information and plural sequential blocks of digital bits, each block of digital bits including plural data bits and a block parity bit, the sequence of blocks from the second tributary line means including in a periodic one of the block parity bit positions, a complemented block parity bit containing control information; and
   means for interleaving the blocks of digital bit streams from the first and second tributary line means into a multiplexed bit stream.

2. A digital block multiplexer in accordance with claim 1 further comprising
   means responsive to a phase modulated line signal from the first tributary line for impressing phase modulation on the multiplexed bit stream.

3. A digital block multiplexer in accordance with claim 1 further comprising
   means responsive to a phase modulated line signal from the second tributary line for impressing phase modulation on the multiplexed bit stream.

4. A digital transmission system for interleaving blocks of bits from each of a plurality of input tributary lines, the system comprising
   first and second transmitting tributary line means, each for producing a sequence of blocks of digital bit streams in frames, each frame including tributary line identification information and plural sequential blocks of digital bits, each block of digital bits including plural data bits and a block parity bit, the stream of blocks of digital bit streams from the second tributary line means including a periodic one of the parity bits containing control information,
   means for interleaving the blocks of digital bit streams from the first and second tributary lines into a multiplexed bit stream without service bits between the blocks, and
   means responsive to the parity bits and the tributary line identification information in the multiplexed bit stream for demultiplexing the blocks of the digital bit streams into identified sequences of blocks of digital bit streams in continuous streams of frames for first and second reveiving tributary lines.

5. A digital block demultiplexer for separating blocks of bits from a block multiplexed bit stream, the demultiplexer comprising
   means for receiving the multiplexed bit stream including interleaved blocks of digital bit streams in frames from first and second tributary lines, each frame including tributary line identification information and plural sequential blocks of digital bits, each block of digital bits including plural data bits and a block parity bit, the sequence of blocks from the second tributary line including in a periodic one of the parity bit positions, a complemented parity bit containing control information; and
   means for separating the blocks of digital bit streams from the first and second tributary lines into separate continuous tributary line signals including blocks with parity bits annd complemented parity bits containing control information.

6. A digital block demultiplexer in accordance with claim 5 further comprising
   means responsive to a phase modulated signal on the multiplexed bit stream for impressing phase modulation on the sequences of blocks of digital bit streams in frames for the separate tributary line signals.

7. A digital block multiplexer for interleaving blocks of bits from each of a plurality of input tributary lines, the multiplexer comprising
   means for receiving sequences of blocks of digital bit streams in frames, respectively from first and second tributary lines, each frame including tributary line identification information and plural blocks of digital bits, each block of digital bits including plural data bits and a block parity bit, the sequence of blocks from the second tributary line means including in a periodic one of the block parity bit positions, a complemented block parity bit contaning control information; and
   means fcr interleaving the blocks of digital bit streams from the first and second tributary line means into a multiplexed bit stream on a repeatered line wher the block parity bits and the complemented block parity bits continuing control information are used for their intended purposes.

8. A digital block multiplexer in accordance with claim 7 further comprising
   means responsive to a phase modulated line signal from the first tributary line for impressing phase modulation on the multiplexed bit stream.

9. A digital block multiplexer in accordance with claim 7 further comprising
   means responsive to a phase modulated line signal from the second tributary line for impressing phase modulation on the multiplexed bit stream.

10. A digital transmission system for interleaving blocks of bits from each of a plurality of input tributary lines, the system comprising
    first and second transmitting tributary line means, each for producing a sequence of blocks of digital bit streams in frames, each frame including tributary line identification information and plural blocks of digital bits, each block of digital bits including plural data bits and a block parity bit, the stream of blocks of digital bit streams from the second tributary line means including a periodic one of the block parity bits complemented by control information;
    means for interleaving the blocks of digital bit streams from the first and second tributary lines into a multiplexed bit stream on a repeatered line where the block party bits and the block parity bits complemented by control information are used for their intended purposes and
    means responsive to the block parity bits and the tributary line identification information in the multiplexed bit stream for demultiplexing the blocks of the digital bit streams into identified sequences of blocks of digital bit streams in frames for first and second receiving tributary lines.

11. A digital block demultiplexer for separating blocks of bits from a multiplexed bit stream, the demultiplexer comprising means for receiving from a repeatered line the multiplexed bit stream including interleaved blocks of digital bit streams in frames from first and second tributary lines, each frame including tributary line identification information and plural blocks of digital bits, each block of digital bits including plural data bits and a block parity bit, the sequence of blocks from the second tributary line including in a periodic one of the block parity bit positions, a complemented block parity bit containing control information, the block parity bits and the complemented block parity bit containing control information are used for their intended purposes; and means for separating the blocks of digital bit streams from the first and second tributary lines into separate tributary line signals including block parity bits and complemented block parity bits containing control information used for their intended purposes.

12. A digital block demultiplexer in accordance with claim 11 further comprising means responsive to a phase modulated signal on the multiplexed bit stream for impressing phase modulation on the sequences of blocks of digital bit streams in frames for the separate tributary line signals.

13. A digital block multiplexer for interleaving blocks of bits from each of a plurality of input tributary lines, the multiplexer comprising means for receiving sequences of blocks of digital bit streams in frames at a bit rate of X bits per second, respectively from first and second tibutary lines, each frame including tributary line identification infromation and plural blocks of digital bits, each block of digital bits including plural data bits and a block parity bit, the sequence of blocks from the second tributary lines including in a periodic one of the block parity bit positions, a complemented block parity bit containing control information; and means for interleaving the blocks of digital bit streams from the first and second tributary lines into a multiplexed bit stream at a bit rate of nX bits per second, where X is a number and n equals the number of tributary lines.

14. A digital block multiplexer in accordance with claim 13 further comprising means responsive to a phase modulated line signal from the first tributary line for impressing phase modulation on the multiplexed bit stream.

15. A digital block multiplexer in accordance with claim 13 further comprising means responsive to a phase modulated line signal from the second tributary line for impressing phase modulation on the multiplexed bit stream.

16. A digital transmission system for interleaving blocks of bits from each of a plurality of input tributary lines, the system comprising first and second transmitting tributary line means, each for producing a sequence of blocks of digital bit streams in frames at a bit rate of X bits per second, each frame including tributary line identification information and plural blocks of digital bits, each block of digital bits including plural data bits and a block parity bit, the stream of blocks of digital bit streams from the second tributary line means including a periodic one of the block parity bits complemented by control information, means for interleaving the blocks of digital bit streams from the first and second tributary lines into a multiplexed bit stream at a bit rate of nX bits per second, and means responsive to the block parity bits and the tributary line identification information in the multiplexed bit stream for demultiplexing the blocks of the digital bit streams into identified sequences of blocks of digital bit streams in frames at a bit rate of X bits per second for first and second receiving tributary lines, where X is a number and n equals the number of tributary lines.

17. A digital block demultiplexer for separating blocks of bits from a multiplesed bit stream, the demultiplexer comprising means for receiving the multiplexed bit stream at a bit rate of nX bits per second including interleaved blocks of digital bit streams in frames from first and second tributary lines, each frame including tributary line identification information and plural blocks of digital bits, each block of digital bits including plural data bits and a block parity bit, the sequence of blocks from the second tributary line including in a periodic one of the block parity bit positions, a complemented block parity bit containing control information; and means for separating the blocks of digital bit streams from the first and second tributary line means into separate tributary line signals at a bit rate of X bits per second including block parity bits and complemented block parity bits containing control information, where X is a number and n equals the number of tributary lines.

18. A digital block demultiplexer in accordance with claim 17 further comprising means responsive to a phase modulated signal on the multiplexed bit stream for impressing phase modulation on the sequences of blocks of digital bit streams in frames for the separate tributary line signals.

19. A digital block multiplexer for interleaving blocks of bits from each of a plurality of input tributary lines, the multiplexer comprising means for receiving sequences of blocks of digital bit streams in frames at a bit rate of X bits per second, respectively from first and second tributary lines, each frame including tributary line identification information and plural blocks of digital bits sequentially, each block of digital bits including plural data bits and a block parity bit, the sequence of blocks from the second tributary line means including in a periodic one of the parity bit positions, a complemented block parity bit containing control information; and means for interleaving the blocks of digital bit streams from the first and second tributary line means into a multiplexed bit stream on a repeatered line without service bits between blocks at a bit rate of nX bits per second, where X is a number, n equals the number of tributaries, and the block parity bits and the complemented block parity bits containing control information are useful along the repeatered line.

20. A digital block multiplexer in accordance with claim 19 further comprising means responsive to a phase modulated line signal from the first tributary line for impressing phase modulation on the multiplexed bit stream.

21. A digital block multiplexer in accordance with claim 19 further comprising
means responsive to a phase modulated line signal from the second tributary line for impressing phase modulation on the multiplexed bit stream.

22. A digital transmission system for interleaving blocks of bits from each of a plurality of input tributary lines, the system comprising
first and second transmitting tributary line means, each for producing a sequence of blocks of digital bit streams in frames at a bit rate of X bits per second, each frame including tributary line indentification information and plural blocks of digital bits sequentially, each block of digital bits including plural data bits and a block parity bit, the stream of blocks of digital bit streams from the second tributary line means including a periodic one of the parity bits complemented by control information,
means for interleaving the blocks of digital bits streams from the first and second tributary lines into a multiplexed bit stream without service bits on a repeatered line at a bit rate of nX bits per second, and
means responsive to the block parity bits and the tributary line identification information in the multiplexed bit stream for demultiplexing the blocks of the digital bit streams into identified sequences of blocks of digital bit strams in frames at a bit rate of X bits per second for first and second receiving tributary lines, where X is a number, n equals the number of tributaries, and the block parity bits and parity bits complemented by control information are useful.

23. A digital block demultiplexer for separating blocks of bits from a multiplexed bit stream, the demultiplexer comprising
means for receiving the multiplexed bit stream at a bit rate of nX bits per second including interleaved blocks of digital bit streams in frames from first and second tributary lines, each frame including tributary line identification information and plural sequential blocks of digital bits, each block of digital bits including plural data bits and a block parity bit, the sequence of blocks in the multiplexed bit stream from the second tributary line including in a periodic one of the block parity bit positions, a complemented block parity bit containing control information; and
means for separating the blocks of digital bit streams from the first and second tributary lines into separate tributary line signals at a bit rate of X bits per second including blocks with the block parity bits and the complemented block parity bits containing control information, where X is a number and n equals the number of tributary lines.

24. A digital block demultiplexer in accordance with claim 23 further comprising
means responsive to a phase modulated signal on the multiplexed bit stream for impressing phase modulation on the sequences of blocks of digital bit streams in frames for the separate tributary line signals.

25. A digital block multiplexer for interleaving blocks of bits from each of a plurality of input tributary lines, the multiplexer comprising
means for receiving sequences of blocks of digital bit streams in frames at a bit rate of X bits per second, respectively from first and second tributary lines, each frame including tributary line identification information and plural blocks of digital bits, each block of digital bits including plural data bits and a block parity bit, the sequence of blocks from the second tributary line including, in a periodic one of the block parity bit positions, a complemented block parity bit containing control information; and
means for interleaving the blocks of digital bit streams from the first and second tributary lines into a multiplexed bit stream at a rate of nX bits per second without service bits between blocks in the multiplexed bit streams, where X is a number and n equals the number of tributary lines.

26. A digital block multiplexer for interleaving blocks of bits from a plurality of input tributary lines, in accordance with claim 25, wherein
the blocks of digital bits at the rate of X bits per second from each tributary line occupy the entire duration of each frame in the tributary line bit stream; and
the blocks of digital bits at the rate of nX bits per second in the multiplexed bit stream occupy the entire duration of each frame in the multiplexed bit stream.

27. A digital block multiplexer for interleaving blocks of bits from each of a plurality of input tributary lines, the multiplexer comprising
means for receiving sequences of blocks of digital bit streams in frames, respectively from first and second tributary lines, each frame including tributary line identification information and plural blocks of digital bits, each block of digital bits including plural data bits and a block parity bit, the sequence of blocks from the second tributary line including, in a periodic one of the block parity bit positions, a complemented block parity bit containing control information;
means for interleaving the blocks of digital bit streams from the first and second tributary lines into a multiplexed bit stream on a repeatered line, wherein the block parity bits are positioned to provide an indication of block parity errors without reframing the bit stream and the complemented block parity bits containing control information control equipment along the repeatered line.

28. A method for multiplexing blocks of data bits from a plurality of tributary lines, the method comprising the steps of:
receiving sequences of blocks of continuous digital bit streams in frames, respectively from first and second tributary lines, each frame including tributary line identification information and plural blocks of digital bits, each block of digital bits including plural data bits and a block parity bit, the sequence of blocks from the second tributary line including, in a periodic one of the block parity bit positions, a complemented block parity bit containing control information; and
interleaving the blocks of digital bit streams from the first and second tributary lines into a multiplexed bit stream.

29. A method for multiplexing blocks of data bits, in accordance with claim 28, comprising the further step of:

impressing phase modulation on the multiplexed bit stream from a phase modulated line signal on the first tributary line.

30. A method for multiplexing blocks of data bits, in accordance with claim 28, comprising the further step of:

impressing phase modulation on the multiplexed bit stream from a phase modulated line signal on the second tributary line.

31. A method for demultiplexing blocks of data bits from a block multiplexed bit stream, the method comprising the steps of:

receiving the block multiplexed bit stream including interleaved blocks of digital bit streams in frames from first and second tributary lines, each frame including tributary line identification information and plural blocks of digital bits, each block of digital bits including plural data bits and a block parity bit, the sequence of blocks from the second tributary line including, in a periodic one of the block parity bit positions, a complemented block parity bit containing control information; and separating the blocks of digital bit streams from the first and second tributary lines into separate continuous tributary line signals, each separate line signal including a sequence of blocks of digital bits in frames with block parity bits and complemented block parity bits containing control information for one of the tributary lines.

32. A method for demultiplexing blocks of data bits from a block multiplexed bit stream, in accordance with claim 31, comprising the further step of:

impressing phase modulation on the separate continuous line signals from a phase modulated signal on the multiplexed bit stream.

* * * * *